United States Patent
Layouni et al.

(10) Patent No.: US 12,448,010 B2
(45) Date of Patent: Oct. 21, 2025

(54) SYSTEM AND METHOD FOR MITIGATING CONGESTION AT TRAFFIC SIGNALS

(71) Applicant: GM Global Technology Operations LLC, Detroit, MI (US)

(72) Inventors: Mohamed A. Layouni, Fraser, MI (US); Markus Jochim, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 254 days.

(21) Appl. No.: 18/362,106

(22) Filed: Jul. 31, 2023

(65) Prior Publication Data

US 2025/0042443 A1 Feb. 6, 2025

(51) Int. Cl.
*B60W 60/00* (2020.01)
*B60Q 1/46* (2006.01)
*B60W 50/14* (2020.01)
*G08G 1/01* (2006.01)

(52) U.S. Cl.
CPC .......... *B60W 60/0053* (2020.02); *B60Q 1/46* (2013.01); *B60W 50/14* (2013.01);
(Continued)

(58) Field of Classification Search
CPC ............ B60W 60/0053; B60W 50/14; B60W 60/001; B60W 60/0051; B60W 2050/146;
(Continued)

(56) References Cited

U.S. PATENT DOCUMENTS

2012/0026014 A1 * 2/2012 Miller ...................... G08G 1/07
340/929
2017/0248954 A1 * 8/2017 Tomatsu ............. B60W 50/082
(Continued)

FOREIGN PATENT DOCUMENTS

| CA | 3026666 A1 * | 12/2018 | ............ B60W 50/10 |
| DE | 102019003786 A1 * | 1/2020 | ....... G08G 1/096708 |
| WO | WO-2016089438 A1 * | 6/2016 | ............... G08G 1/22 |

OTHER PUBLICATIONS

Machine translation of DE102019003786 downloaded from IP.com Jun. 8, 2025 (Year: 2025).*

(Continued)

*Primary Examiner* — Michael V Kerrigan
*Assistant Examiner* — Tanya C Sienko
(74) *Attorney, Agent, or Firm* — Vivacqua Crane, PLLC (57) ABSTRACT

A system for mitigating traffic congestion for a vehicle includes a plurality of vehicle sensors, an automated driving system, and a controller in electrical communication with the plurality of vehicle sensors and the automated driving system. The controller is programmed to determine a traffic signal phase of a traffic signal in an environment surrounding the vehicle using the plurality of vehicle sensors. The traffic signal phase includes one of a red phase and a green phase. The controller is further programmed to activate the automated driving system to drive the vehicle for a predetermined maximum time-period in response to determining that the traffic signal phase is the green phase. The controller is further programmed to disable the automated driving system in response to determining that the predetermined maximum time-period has expired.

16 Claims, 3 Drawing Sheets

(52) U.S. Cl.
CPC ...... *B60W 60/001* (2020.02); *B60W 60/0051* (2020.02); *G08G 1/0145* (2013.01); *B60W 2050/146* (2013.01); *B60W 2420/403* (2013.01); *B60W 2510/18* (2013.01); *B60W 2540/10* (2013.01); *B60W 2540/12* (2013.01); *B60W 2555/60* (2020.02); *B60W 2556/50* (2020.02); *B60W 2556/65* (2020.02)

(58) Field of Classification Search
CPC ....... B60W 2420/403; B60W 2510/18; B60W 2540/10; B60W 2540/12; B60W 2555/60; B60W 2556/50; B60W 2556/65; B60Q 1/46; G08G 1/0145
See application file for complete search history.

(56) References Cited

U.S. PATENT DOCUMENTS

| | | | |
|---|---|---|---|
| 2018/0150074 A1* | 5/2018 | Hashimoto | ....... B60W 60/0053 |
| 2018/0162409 A1* | 6/2018 | Altmannshofer | ........................... G08G 1/096708 |
| 2021/0276594 A1* | 9/2021 | Oh | ........................ H04W 4/44 |
| 2022/0101728 A1* | 3/2022 | Wolf | ................ G08G 1/096844 |
| 2022/0153273 A1* | 5/2022 | Metli | .............. B60W 30/18154 |
| 2023/0242111 A1* | 8/2023 | Aggoune | .............. B60W 20/12 701/22 |
| 2023/0280183 A1* | 9/2023 | Hayat | ................ G01C 21/3889 701/423 |

OTHER PUBLICATIONS

"Supervisor and Control Investigation in Smart/Autonomous Vehicles: Environment Recognition and objects detection ADAS Application Case Study" by O. Abid et al., 2018 11th International Symposium on Mechatronics and its Applications (ISMA), Sharjah, United Arab Emirates, 2018, pp. 1-7 (Year: 2018).*
CGP Grey. "The Simple Solution to Traffic," YouTube, uploaded Aug. 31, 2016, <<https://www.youtube.com/watch?v=iHzzSao6ypE>>.

* cited by examiner

SYSTEM AND METHOD FOR MITIGATING CONGESTION AT TRAFFIC SIGNALS

INTRODUCTION

The present disclosure relates to advanced driver assistance and automated driving systems and methods for vehicles, and more particularly, to systems and methods for mitigating traffic congestion for a vehicle.

To increase occupant awareness and convenience, vehicles may be equipped with advanced driver assistance systems (ADAS) and/or automated driving systems (ADS). ADAS systems may use various sensors such as cameras, radar, and LiDAR to detect and identify objects around the vehicle, including other vehicles, pedestrians, road configurations, and traffic signs. ADAS systems may take actions based on environmental conditions surrounding the vehicle, such as applying brakes or alerting an occupant of the vehicle. However, current ADS systems may not account for additional factors which may affect occupant experience. For example, traffic jams may develop at traffic signals due to variations in reaction time and attentiveness of drivers.

Thus, while ADAS and ADS systems and methods achieve their intended purpose, there is a need for a new and improved system and method for mitigating traffic congestion for a vehicle.

SUMMARY

According to several aspects, a system for mitigating traffic congestion for a vehicle is provided. The system includes a plurality of vehicle sensors, an automated driving system, and a controller in electrical communication with the plurality of vehicle sensors and the automated driving system. The controller is programmed to determine a traffic signal phase of a traffic signal in an environment surrounding the vehicle using the plurality of vehicle sensors. The traffic signal phase includes one of a red phase and a green phase. The controller is further programmed to activate the automated driving system to drive the vehicle for a predetermined maximum time-period in response to determining that the traffic signal phase is the green phase. The controller is further programmed to disable the automated driving system in response to determining that the predetermined maximum time-period has expired.

In another aspect of the present disclosure, the plurality of vehicle sensors further includes a camera system. To determine the traffic signal phase, the controller is further programmed to capture an image of the environment surrounding the vehicle including the traffic signal using the camera system. To determine the traffic signal phase, the controller is further programmed to determine the traffic signal phase in the image using a computer vision algorithm.

In another aspect of the present disclosure, the plurality of vehicle sensors further includes a vehicle communication system. To determine the traffic signal phase, the controller is further programmed to receive a signal phase and timing (SPaT) message from the traffic signal using the vehicle communication system. The SPaT message includes the traffic signal phase.

In another aspect of the present disclosure, the plurality of vehicle sensors further includes a vehicle communication system. To determine the traffic signal phase, the controller is further programmed to receive a vehicle-to-vehicle (V2V) communication from a remote vehicle. The V2V communication includes the traffic signal phase.

In another aspect of the present disclosure, to activate the automated driving system to drive the vehicle, the controller is further programmed to determine a system activation state. The system activation state includes one of a system active state and a system inactive state. To activate the automated driving system to drive the vehicle, the controller is further programmed to activate the automated driving system to drive the vehicle in response to determining that the system activation state is the system active state and the traffic signal phase is the green phase. To activate the automated driving system to drive the vehicle, the controller is further programmed to start a first timer in response to determining that the system activation state is the system active state and the traffic signal phase is the green phase.

In another aspect of the present disclosure, to determine the system activation state, the controller is further programmed to determine a drive mode of the vehicle. The drive mode includes one of a forward drive mode and a non-forward drive mode. To determine the system activation state, the controller is further programmed to determine a brake hold state of the vehicle. The brake hold state includes one of a brake hold active state and a brake hold inactive state. To determine the system activation state, the controller is further programmed to determine an accelerator pedal position of the vehicle. To determine the system activation state, the controller is further programmed to determine the system activation state to be the system active state in response to determining that the drive mode is the forward drive mode, the brake hold state is the brake hold active state, and the accelerator pedal position is less than or equal to a predetermined accelerator pedal position threshold.

In another aspect of the present disclosure, to disable the automated driving system, the controller is further programmed to prompt an occupant of the vehicle to disable the automated driving system in response to determining that a value of the first timer is greater than or equal to a predetermined first timer threshold. The controller is further programmed to start a second timer in response to determining that the value of the first timer is greater than or equal to the predetermined first timer threshold. The controller is further programmed to disable the automated driving system in response to determining that a value of the second timer is greater than or equal to a predetermined second timer threshold. The predetermined maximum time-period is equal to a sum of the predetermined first timer threshold and the predetermined second timer threshold.

In another aspect of the present disclosure, the plurality of vehicle sensors further includes a vehicle communication system. To disable the automated driving system in response to determining that the value of the second timer is greater than or equal to the predetermined second timer threshold, the controller is further programmed to enable a hazard light of the vehicle. To disable the automated driving system in response to determining that the value of the second timer is greater than or equal to the predetermined second timer threshold, the controller is further programmed to transmit a vehicle-to-everything (V2X) message using the vehicle communication system. The V2X message indicates that the automated driving system is disabled. To disable the automated driving system in response to determining that the value of the second timer is greater than or equal to the predetermined second timer threshold, the controller is further programmed to disable the automated driving system.

In another aspect of the present disclosure, to disable the automated driving system, the controller is further programmed to continuously monitor an accelerator pedal position of the vehicle. To disable the automated driving system, the controller is further programmed to continuously monitor a brake pedal position of the vehicle. To disable the automated driving system, the controller is further programmed to disable the automated driving system in response to determining that the accelerator pedal position is greater than or equal to a predetermined accelerator pedal position threshold. To disable the automated driving system, the controller is further programmed to disable the automated driving system in response to determining that the brake pedal position is greater than or equal to a predetermined brake pedal position threshold.

In another aspect of the present disclosure, the controller is further programmed to notify an occupant of the vehicle of a status of the automated driving system. The status of the automated driving system includes one of an active state, a pending deactivation state, and an inactive state.

According to several aspects, a method for mitigating traffic congestion for a vehicle is provided. The method includes determining a traffic signal phase of a traffic signal in an environment surrounding the vehicle using a plurality of vehicle sensors. The traffic signal phase includes one of a red phase and a green phase. The method also includes activating an automated driving system to drive the vehicle for a predetermined maximum time-period in response to determining that the traffic signal phase is the green phase. The method also includes disabling the automated driving system in response to determining that the predetermined maximum time-period has expired.

In another aspect of the present disclosure, determining the traffic signal phase further may include receiving a signal phase and timing (SPaT) message from the traffic signal using a vehicle communication system. The SPaT message includes the traffic signal phase.

In another aspect of the present disclosure, activating the automated driving system to drive the vehicle further may include determining a system activation state. The system activation state includes one of a system active state and a system inactive state. Activating the automated driving system to drive the vehicle further may include activating the automated driving system to drive the vehicle in response to determining that the system activation state is the system active state and the traffic signal phase is the green phase. Activating the automated driving system to drive the vehicle further may include starting a first timer in response to determining that the system activation state is the system active state and the traffic signal phase is the green phase.

In another aspect of the present disclosure, determining the system activation state further may include determining a drive mode of the vehicle. The drive mode includes one of a forward drive mode and a non-forward drive mode. Determining the system activation state further may include determining a brake hold state of the vehicle. The brake hold state includes one of a brake hold active state and a brake hold inactive state. Determining the system activation state further may include determining an accelerator pedal position of the vehicle. Determining the system activation state further may include determining the system activation state to be the system active state in response to determining that the drive mode is the forward drive mode, the brake hold state is the brake hold active state, and the accelerator pedal position is less than or equal to a predetermined accelerator pedal position threshold.

In another aspect of the present disclosure, disabling the automated driving system further may include prompting an occupant of the vehicle to disable the automated driving system in response to determining that a value of the first timer is greater than or equal to a predetermined first timer threshold. Disabling the automated driving system further may include starting a second timer in response to determining that the value of the first timer is greater than or equal to the predetermined first timer threshold. Disabling the automated driving system further may include disabling the automated driving system in response to determining that a value of the second timer is greater than or equal to a predetermined second timer threshold. The predetermined maximum time-period is equal to a sum of the predetermined first timer threshold and the predetermined second timer threshold.

In another aspect of the present disclosure, disabling the automated driving system in response to determining that a value of the second timer is greater than or equal to a predetermined second timer threshold further may include enabling a hazard light of the vehicle. Disabling the automated driving system in response to determining that a value of the second timer is greater than or equal to a predetermined second timer threshold further may include transmitting a vehicle-to-everything (V2X) message using a vehicle communication system. The V2X message indicates that the automated driving system is disabled. Disabling the automated driving system in response to determining that a value of the second timer is greater than or equal to a predetermined second timer threshold further may include disabling the automated driving system.

In another aspect of the present disclosure, disabling the automated driving system further may include monitoring an accelerator pedal position of the vehicle. Disabling the automated driving system further may include monitoring a brake pedal position of the vehicle. Disabling the automated driving system further may include disabling the automated driving system in response to determining that the accelerator pedal position is greater than or equal to a predetermined accelerator pedal position threshold. Disabling the automated driving system further may include disabling the automated driving system in response to determining that the brake pedal position is greater than or equal to a predetermined brake pedal position threshold.

According to several aspects, a system for mitigating traffic congestion for a vehicle is provided. The system includes a vehicle communication system, an automated driving system, a display, and a controller in electrical communication with the vehicle communication system, the automated driving system, and the display. The controller is programmed to receive a signal phase and timing (SPaT) message using the vehicle communication system. The SPAT message includes a traffic signal phase of a traffic signal in an environment surrounding the vehicle. The traffic signal phase includes one of a red phase and a green phase. The controller is further programmed to determine a system activation state. The system activation state includes one of a system active state and a system inactive state. The controller is further programmed to activate the automated driving system to drive the vehicle in response to determining that the system activation state is the system active state and the traffic signal phase is the green phase. The controller is further programmed to start a first timer in response to determining that the system activation state is the system active state and the traffic signal phase is the green phase. The controller is further programmed to prompt an occupant of the vehicle to disable the automated driving system using the display in response to determining that a value of the first timer is greater than or equal to a predetermined first timer threshold. The controller is further programmed to start a second timer in response to determining that the value of the first timer is greater than or equal to the predetermined first timer threshold. The controller is further programmed to disable the automated driving system in response to determining that a value of the second timer is greater than or equal to a predetermined second timer threshold.

In another aspect of the present disclosure, to disable the automated driving system, the controller is further programmed to enable a hazard light of the vehicle. To disable the automated driving system, the controller is further programmed to transmit a vehicle-to-everything (V2X) message using the vehicle communication system and disable the automated driving system. The V2X message indicates that the automated driving system is disabled.

In another aspect of the present disclosure, to disable the automated driving system, the controller is further programmed to continuously monitor an accelerator pedal position of the vehicle. To disable the automated driving system, the controller is further programmed to continuously monitor a brake pedal position of the vehicle. To disable the automated driving system, the controller is further programmed to disable the automated driving system in response to determining that the accelerator pedal position is greater than or equal to a predetermined accelerator pedal position threshold. To disable the automated driving system, the controller is further programmed to disable the automated driving system in response to determining that the brake pedal position is greater than or equal to a predetermined brake pedal position threshold.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

When a line of vehicles is stopped an intersection controlled by a traffic signal, and the traffic signal switches phase to a green (i.e., go) phase, delays in human reaction time and variations in driver attentiveness may result in vehicles accelerating at different times and/or rates. These variations in acceleration may result in reduced throughput at the intersection as the variations propagate back through the line of vehicles, often increasing in magnitude. Therefore, the present disclosure provides a new and improved system and method for mitigating traffic congestion for vehicles allowing for synchronous acceleration of vehicles at the intersection.

Figure 1:
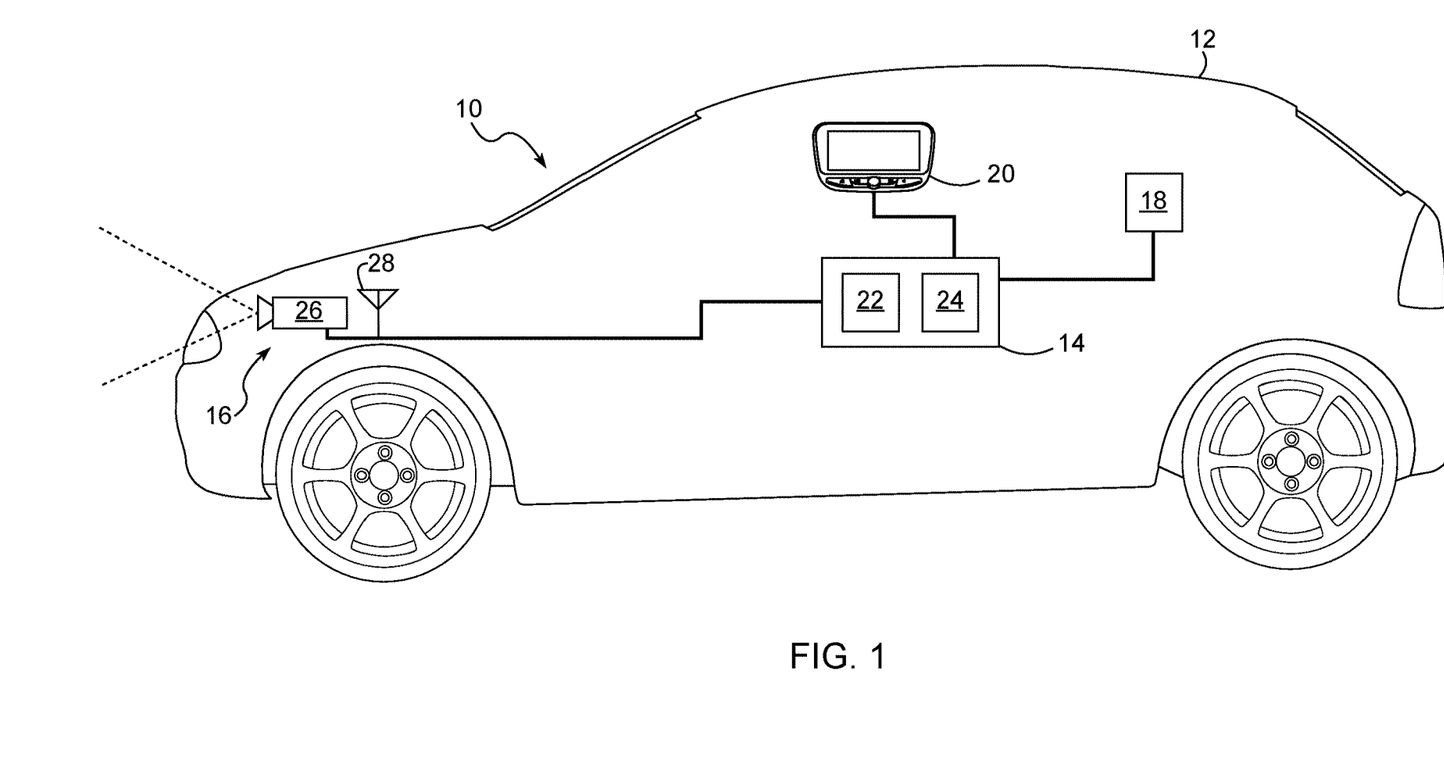
FIG. 1 is a schematic diagram of a system for mitigating traffic congestion for a vehicle, according to an exemplary embodiment.

Referring to FIG. 1, a system for mitigating traffic congestion for a vehicle is illustrated and generally indicated by reference number 10. The system 10 is shown with an exemplary vehicle 12. While a passenger vehicle is illustrated, it should be appreciated that the vehicle 12 may be any type of vehicle without departing from the scope of the present disclosure. The system 10 generally includes a controller 14, a plurality of vehicle sensors 16, an automated driving system 18, and a display 20.

The controller 14 is used to implement a method 100 for mitigating traffic congestion for a vehicle, as will be described below. The controller 14 includes at least one processor 22 and a non-transitory computer readable storage device or media 24. The processor 22 may be a custom made or commercially available processor, a central processing unit (CPU), a graphics processing unit (GPU), an auxiliary processor among several processors associated with the controller 14, a semiconductor-based microprocessor (in the form of a microchip or chip set), a macroprocessor, a combination thereof, or generally a device for executing instructions. The computer readable storage device or media 24 may include volatile and nonvolatile storage in read-only memory (ROM), random-access memory (RAM), and keep-alive memory (KAM), for example. KAM is a persistent or nonvolatile memory that may be used to store various operating variables while the processor 22 is powered down. The computer-readable storage device or media 24 may be implemented using a number of memory devices such as PROMs (programmable read-only memory), EPROMS (electrically PROM), EEPROMs (electrically erasable PROM), flash memory, or another electric, magnetic, optical, or combination memory devices capable of storing data, some of which represent executable instructions, used by the controller 14 to control various systems of the vehicle 12. The controller 14 may also consist of multiple controllers which are in electrical communication with each other. The controller 14 may be inter-connected with additional systems and/or controllers of the vehicle 12, allowing the controller 14 to access data such as, for example, speed, acceleration, braking, and steering angle of the vehicle 12.

The controller 14 is in electrical communication with the plurality of vehicle sensors 16, the automated driving system 18, and the display 20. In an exemplary embodiment, the electrical communication is established using, for example, a CAN network, a FLEXRAY network, a local area network (e.g., WiFi, ethernet, and the like), a serial peripheral interface (SPI) network, or the like. It should be understood that various additional wired and wireless techniques and communication protocols for communicating with the controller 14 are within the scope of the present disclosure.

The plurality of vehicle sensors 16 are used to acquire information about an environment surrounding the vehicle 12. In an exemplary embodiment, the plurality of vehicle sensors 16 includes at least a camera system 26 and a vehicle communication system 28.

In another exemplary embodiment, the plurality of vehicle sensors 16 further includes sensors to determine performance data about the vehicle 12. In a non-limiting example, the plurality of vehicle sensors 16 further includes at least one of a motor speed sensor, a motor torque sensor, an electric drive motor voltage and/or current sensor, an accelerator pedal position sensor, a brake position sensor, a coolant temperature sensor, a cooling fan speed sensor, and a transmission oil temperature sensor.

In another exemplary embodiment, the plurality of vehicle sensors 16 further includes sensors to determine information about the environment within the vehicle 12. In a non-limiting example, the plurality of vehicle sensors 16 further includes at least one of a seat occupancy sensor, a cabin air temperature sensor, a cabin motion detection sensor, a cabin camera, a cabin microphone, and/or the like.

In another exemplary embodiment, the plurality of vehicle sensors 16 further includes sensors to determine information about the environment surrounding the vehicle 12. In a non-limiting example, the plurality of vehicle sensors 16 further includes at least one of an ambient air temperature sensor, a barometric pressure sensor, a global navigation satellite system (GNSS), and/or a photo and/or video camera which is positioned to view the environment in front of the vehicle 12.

In another exemplary embodiment, at least one of the plurality of vehicle sensors 16 is capable of measuring distances in the environment surrounding the vehicle 12. In a non-limiting example, the plurality of vehicle sensors 16 includes a stereoscopic camera having distance measurement capabilities. In one example, at least one of the plurality of vehicle sensors 16 is affixed inside of the vehicle 12, for example, in a headliner of the vehicle 12, having a view through a windscreen of the vehicle 12. In another example, at least one of the plurality of vehicle sensors 16 is affixed outside of the vehicle 12, for example, on a roof of the vehicle 12, having a view of the environment surrounding the vehicle 12. It should be understood that various additional types of vehicle sensors, such as, for example, LiDAR sensors, ultrasonic ranging sensors, radar sensors, and/or time-of-flight sensors are within the scope of the present disclosure. The plurality of vehicle sensors 16 are in electrical communication with the controller 14 as discussed above.

The camera system 26 is used to capture images and/or videos of the environment surrounding the vehicle 12. In an exemplary embodiment, the camera system 26 includes a photo and/or video camera which is positioned to view the environment surrounding the vehicle 12. In a non-limiting example, the camera system 26 includes a camera affixed inside of the vehicle 12, for example, in a headliner of the vehicle 12, having a view through a windscreen. In another non-limiting example, the camera system 26 includes a camera affixed outside of the vehicle 12, for example, on a roof of the vehicle 12, having a view of the environment in front of the vehicle 12.

In another exemplary embodiment, the camera system 26 is a surround view camera system including a plurality of cameras (also known as satellite cameras) arranged to provide a view of the environment adjacent to all sides of the vehicle 12. In a non-limiting example, the camera system 26 includes a front-facing camera (mounted, for example, in a front grille of the vehicle 12), a rear-facing camera (mounted, for example, on a rear tailgate of the vehicle 12), and two side-facing cameras (mounted, for example, under each of two side-view mirrors of the vehicle 12). In another non-limiting example, the camera system 26 further includes an additional rear-view camera mounted near a center high mounted stop lamp of the vehicle 12.

It should be understood that camera systems having additional cameras and/or additional mounting locations are within the scope of the present disclosure. It should further be understood that cameras having various sensor types including, for example, charge-coupled device (CCD) sensors, complementary metal oxide semiconductor (CMOS) sensors, and/or high dynamic range (HDR) sensors are within the scope of the present disclosure. Furthermore, cameras having various lens types including, for example, wide-angle lenses and/or narrow-angle lenses are also within the scope of the present disclosure.

The vehicle communication system 28 is used by the controller 14 to communicate with other systems external to the vehicle 12. For example, the vehicle communication system 28 includes capabilities for communication with vehicles ("V2V" communication), infrastructure ("V2I" communication), remote systems at a remote call center (e.g., ON-STAR by GENERAL MOTORS) and/or personal devices. In general, the term vehicle-to-everything communication ("V2X" communication) refers to communication between the vehicle 12 and any remote system (e.g., vehicles, infrastructure, and/or remote systems). In certain embodiments, the vehicle communication system 28 is a wireless communication system configured to communicate via a wireless local area network (WLAN) using IEEE 802.11 standards or by using cellular data communication (e.g., using GSMA standards, such as, for example, SGP.02, SGP.22, SGP.32, and the like). Accordingly, the vehicle communication system 28 may further include an embedded universal integrated circuit card (eUICC) configured to store at least one cellular connectivity configuration profile, for example, an embedded subscriber identity module (eSIM) profile. The vehicle communication system 28 is further configured to communicate via a personal area network (e.g., BLUETOOTH) and/or near-field communication (NFC). However, additional or alternate communication methods, such as a dedicated short-range communications (DSRC) channel and/or mobile telecommunications protocols based on the $3^{rd}$ Generation Partnership Project (3GPP) standards, are also considered within the scope of the present disclosure. DSRC channels refer to one-way or two-way short-range to medium-range wireless communication channels specifically designed for automotive use and a corresponding set of protocols and standards. The 3GPP refers to a partnership between several standards organizations which develop protocols and standards for mobile telecommunications. 3GPP standards are structured as "releases". Thus, communication methods based on 3GPP release 14, 15, 16 and/or future 3GPP releases are considered within the scope of the present disclosure. Accordingly, the vehicle communication system 28 may include one or more antennas and/or communication transceivers for receiving and/or transmitting signals, such as cooperative sensing messages (CSMs). The vehicle communication system 28 is configured to wirelessly communicate information between the vehicle 12 and another vehicle. Further, the vehicle communication system 28 is configured to wirelessly communicate information between the vehicle 12 and infrastructure or other vehicles. It should be understood that the vehicle communication system 28 may be integrated with the controller 14 (e.g., on a same circuit board with the controller 14 or otherwise a part of the controller 14) without departing from the scope of the present disclosure.

The automated driving system 18 is used to provide assistance to an occupant to increase occupant awareness and/or control behavior of the vehicle 12. In the scope of the present disclosure, the occupant includes a driver and/or a passenger of the vehicle 12. In the scope of the present disclosure, the automated driving system 18 encompasses systems which provide any level of assistance to the occupant (e.g., blind spot warning, lane departure warning, and/or the like) and systems which are capable of autonomously driving the vehicle 12 under some or all conditions. It should be understood that all levels of driving automation defined by, for example, SAE J3016 (i.e., SAE LEVEL 0, SAE LEVEL 1, SAE LEVEL 2, SAE LEVEL 3, SAE LEVEL 4, and SAE LEVEL 5) are within the scope of the present disclosure.

In an exemplary embodiment, the automated driving system 18 is configured to detect and/or receive information about the environment surrounding the vehicle 12 and process the information to provide assistance to the occupant. In some embodiments, the automated driving system 18 is a software module executed on the controller 14. In other embodiments, the automated driving system 18 includes a separate automated driving system controller, similar to the controller 14, capable of processing the information about the environment surrounding the vehicle 12. In an exemplary embodiment, the automated driving system 18 may operate in a manual operation mode, a partially automated operation mode, and/or a fully automated operation mode.

In the scope of the present disclosure, the manual operation mode means that the automated driving system 18 provides warnings or notifications to the occupant but does not intervene or control the vehicle 12 directly. In a non-limiting example, the automated driving system 18 receives information from the plurality of vehicle sensors 16. Using techniques such as, for example, computer vision, the automated driving system 18 understands the environment surrounding the vehicle 12 and provides assistance to the occupant. For example, if the automated driving system 18 identifies, based on data from the plurality of vehicle sensors 16, that the vehicle 12 is likely to collide with a remote vehicle, the automated driving system 18 may use the display 20 to provide a warning to the occupant.

In the scope of the present disclosure, the partially automated operation mode means that the automated driving system 18 provides warnings or notifications to the occupant and may intervene or control the vehicle 12 directly in certain situations. In a non-limiting example, the automated driving system 18 is additionally in electrical communication with components of the vehicle 12 such as a brake system, a propulsion system, and/or a steering system of the vehicle 12, such that the automated driving system 18 may control the behavior of the vehicle 12. In a non-limiting example, the automated driving system 18 may control the behavior of the vehicle 12 by applying brakes of the vehicle 12 to avoid an imminent collision. In another non-limiting example, the automated driving system 18 may control the brake system, propulsion system, and steering system of the vehicle 12 to temporarily drive the vehicle 12 towards a predetermined destination. However, intervention by the occupant may be required at any time. In an exemplary embodiment, the automated driving system 18 may include additional components such as, for example, an eye tracking device configured to monitor an attention level of the occupant and ensure that the occupant is prepared to take over control of the vehicle 12.

In the scope of the present disclosure, the fully automated operation mode means that the automated driving system 18 uses data from the plurality of vehicle sensors 16 to understand the environment and control the vehicle 12 to drive the vehicle 12 towards a predetermined destination without a need for control or intervention by the occupant.

In an exemplary embodiment, the automated driving system 18 operates using a machine learning algorithm trained to output control signals for the vehicle 12 based on input data collected from the plurality of vehicle sensors 16. In another exemplary embodiment, the automated driving system 18 operates using a deterministic algorithm which has been programmed to output control signals for the vehicle 12 based on data collected from the plurality of vehicle sensors 16. It should be understood that the automated driving system 18 may be any software and/or hardware module configured to operate in the manual operation mode, the partially automated operation mode, or the fully automated operation mode as described above.

The display 20 is used to provide information to the occupant of the vehicle 12. In the exemplary embodiment depicted in FIG. 1, the display 20 is a human-machine interface (HMI) located in view of the occupant and capable of displaying text, graphics and/or images. It is to be understood that HMI display systems including LCD displays, LED displays, and the like are within the scope of the present disclosure. Further exemplary embodiments where the display 20 is disposed in a rearview mirror are also within the scope of the present disclosure. In another exemplary embodiment, the display 20 includes a head-up display (HUD) configured to provide information to the occupant by projecting text, graphics, and/or images upon the windscreen of the vehicle 12. The text, graphics, and/or images are reflected by the windscreen of the vehicle 12 and are visible to the occupant without looking away from a roadway ahead of the vehicle 12. In another exemplary embodiment, the display 20 includes an augmented reality head-up display (AR-HUD). The AR-HUD is a type of HUD configured to augment the occupant's vision of the roadway ahead of the vehicle 12 by overlaying text, graphics, and/or images on physical objects in the environment surrounding the vehicle 12 within a field-of-view of the occupant. In an exemplary embodiment, the occupant may interact with the display 20 using a human-interface device (HID), including, for example, a touchscreen, an electromechanical switch, a capacitive switch, a rotary knob, and the like. It should be understood that additional systems for displaying information to the occupant of the vehicle 12 are also within the scope of the present disclosure.

Figure 2:
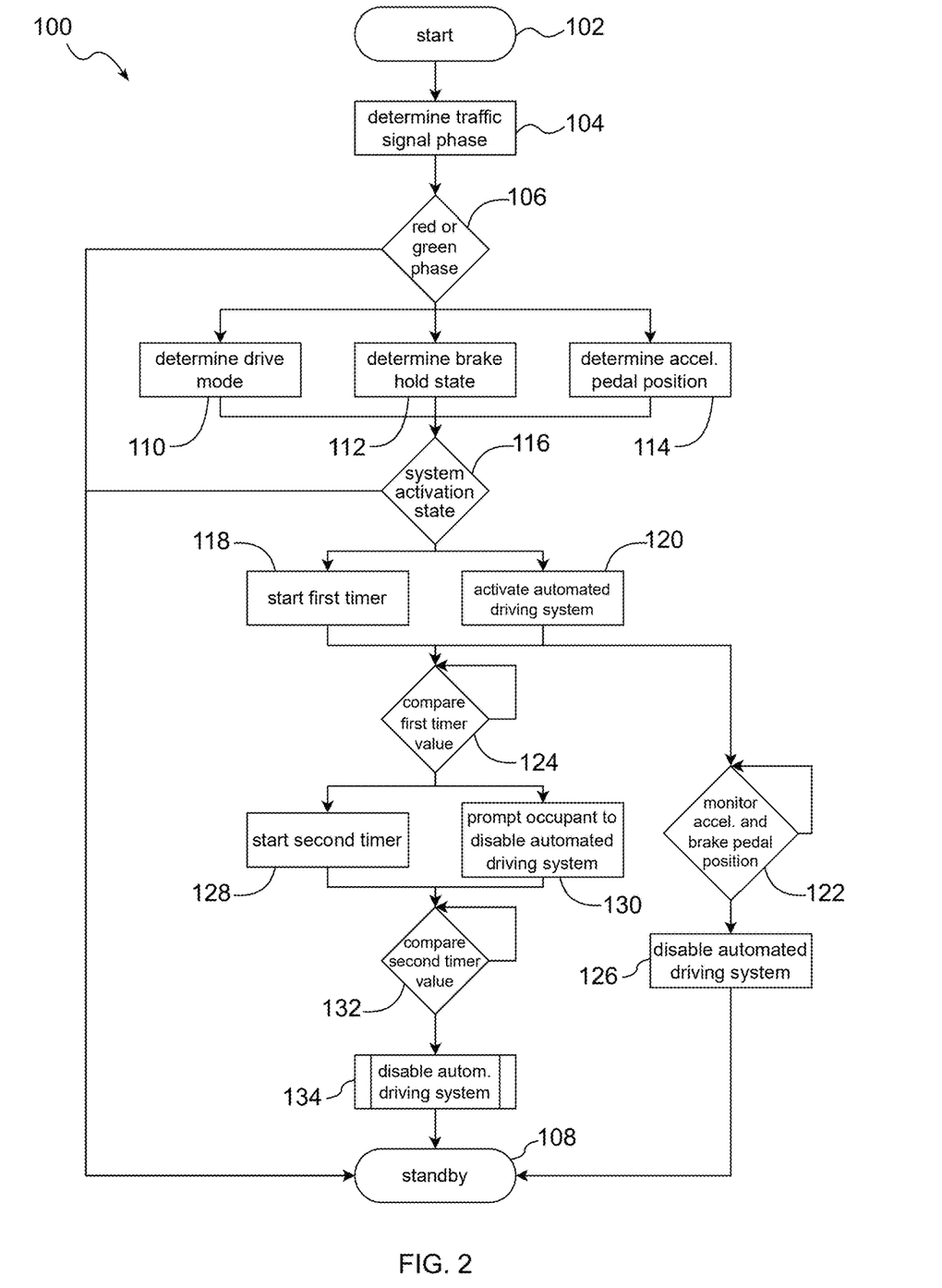
FIG. 2 is a flowchart of a method for mitigating traffic congestion for a vehicle, according to an exemplary embodiment.

Referring to FIG. 2, a flowchart of the method 100 for mitigating traffic congestion for a vehicle is shown. The method 100 begins at block 102 and proceeds to block 104. At block 104, the controller 14 determines a traffic signal phase of a traffic signal in the environment surrounding the vehicle 12 using the plurality of vehicle sensors 16. In the scope of the present disclosure, the traffic signal is a traffic control device controlling traffic through an intersection in a path of the vehicle 12. The traffic signal may have multiple possible states (i.e., phases) which provide information to occupants of vehicles near the traffic signal. The traffic signal phase may include, for example, a red phase (i.e., a stop phase), a green phase (i.e., a go phase), and a yellow phase (i.e., a caution phase, warning of an impending switch to the red phase).

In a first exemplary embodiment of block 104, to determine the traffic signal phase, the controller 14 uses the camera system 26 to capture an image of the environment surrounding the vehicle 12 including the traffic signal. Then, the controller 14 analyses the image using a computer vision algorithm to identify the traffic signal in the image and determine the traffic signal phase. In an exemplary embodiment, the computer vision algorithm utilizes machine learning techniques to analyze pixel-level information of an input image to detect and classify objects or patterns of interest. In a non-limiting example, the computer vision algorithm begins by preprocessing the input image through techniques such as, for example, image resizing, normalization, and/or filtering to reduce noise. Subsequently, the computer vision algorithm extracts relevant features from the input image using methods such as, for example, edge detection, corner detection, texture analysis, and/or the like. The computer vision algorithm may then utilize a machine learning model, such as, for example, a convolutional neural network (CNN), to classify and label relevant features of the input image based on learned patterns and associations.

In a second exemplary embodiment of block 104, to determine the traffic signal phase, the controller 14 uses the vehicle communication system 28 to receive a signal phase and timing (SPaT) message from the traffic signal. In a non-limiting example, the SPAT message contains information about the traffic signal such as, for example, the current signal phase (i.e., the traffic signal phase), the remaining time to next phase (i.e., a time remaining until the next signal phase change), a future signal phase timing (i.e., timing and duration of upcoming signal phases), pedestrian crossing signal phases, and/or the like. The SPaT message is a V2I message which may be transmitted by traffic control infrastructure. For example, the traffic control infrastructure transmitting the SPaT message may include a traffic management center (i.e., a centralized facility which monitors and manages traffic flow), a roadside unit (i.e., a device installed near the traffic signal configured to transmit SPaT messages about the traffic signal), and/or a traffic signal controller (i.e., a device installed near the traffic signal which is primarily configured to control timing and sequencing of the traffic signal, and may also be configured to transmit SPaT messages about the traffic signal).

In a third exemplary embodiment of block 104, to determine the traffic signal phase, the controller 14 receives a vehicle-to-vehicle (V2V) communication from a remote vehicle in the environment surrounding the vehicle 12. The V2V communication includes the traffic signal phase. In a non-limiting example, the remote vehicle may have a more optimal position relative to the traffic signal to determine the traffic signal phase using a camera system. Therefore, the remote vehicle may determine the traffic signal phase using a camera system and communicate the traffic signal phase to the vehicle 12 using the V2V communication. After block 104, the method 100 proceeds to block 106.

At block 106, if the traffic signal phase is the red phase, the method 100 proceeds to enter a standby state at block 108. If the traffic signal phase is the green phase, the method 100 proceeds to blocks 110, 112, and 114.

At block 110, the controller 14 determines a drive mode of the vehicle 12. In the scope of the present disclosure, the drive mode of the vehicle 12 describes a configuration of the propulsion system of the vehicle 12 (e.g., an internal combustion engine and transmission, an electric motor drive system, and/or the like). The drive mode may be a forward drive mode (i.e., a mode which allows the vehicle 12 to move forward) or a non-forward drive mode (i.e., a mode which does not allow the vehicle 12 to move forward). The forward drive mode includes, for example, an automatic forward drive mode ("D" mode), a manual forward drive mode ("M" mode), a low-gear forward drive mode ("L" mode), a sport forward drive mode ("S" mode), and/or the like. The non-forward drive mode includes, for example, a reverse drive mode ("R" mode), a parking mode ("P" mode), and/or the like. In an exemplary embodiment, the occupant of the vehicle 12 may select and/or control the drive mode using, for example, a shifter knob and/or lever in the vehicle 12. To determine the drive mode of the vehicle 12, the controller 14 may communicate with sensors located on the shifter knob and/or retrieve drive mode state information from the media 24 of the controller 14. After block 110, the method 100 proceeds to block 116, as will be discussed in greater detail below.

At block 112, the controller 14 determines a brake hold state of the vehicle 12. In an exemplary embodiment, the controller 14 is used to implement a brake hold feature. The brake hold feature "holds" the brakes of the vehicle 12 when the vehicle 12 is at a standstill, such that the occupant must not constantly depress a brake pedal of the vehicle 12 in order to prevent the vehicle 12 from rolling. In an exemplary embodiment, the controller 14 utilizes one or more of the plurality of vehicle sensors 16 and one or more components of the automated driving system 18 discussed above to implement the brake hold feature. The brake hold feature may be activated and deactivated by the occupant according to occupant preference. In a non-limiting example, the brake hold feature is activated via a human-interface device (HID), such as, for example, a touchscreen of the display 20. Therefore, if the occupant has not activated the brake hold feature, the brake hold state is said to be a brake hold inactive state. Furthermore, if the occupant depresses the brake pedal while the vehicle 12 is at a standstill, the brake hold feature is automatically deactivated, as the occupant has taken manual control of the braking system. Therefore, if the brake pedal has been depressed by the occupant while the vehicle 12 is at a standstill, the brake hold state is said to be the brake hold inactive state. Otherwise, if the occupant has previously activated the brake hold feature and the occupant has not depressed the brake pedal during the standstill, the brake hold state is said to be a brake hold active state. Accordingly, the controller 14 determines the brake hold state based on an activation state of the brake hold feature (e.g., as stored in the media 24 of the controller 14) and a brake pedal position as determined using the plurality of vehicle sensors 16. After block 112, the method 100 proceeds to block 116, as will be discussed in greater detail below.

At block 114, the controller 14 determines an accelerator pedal position using the plurality of vehicle sensors 16. In an exemplary embodiment, the controller 14 uses the accelerator pedal position sensor of the plurality of vehicle sensors 16 to determine the accelerator pedal position. After block 114, the method 100 proceeds to block 116.

At block 116, the controller 14 determines a system activation state of the system 10. If the drive mode is the forward drive mode as determined at block 110, the brake hold state is the brake hold active state as determined at block 112, and the accelerator pedal position is less than or equal to a predetermined accelerator pedal position threshold (e.g., five percent of a maximum accelerator pedal position), the system activation state is determined to be a system active state, and the method 100 proceeds to blocks 118 and 120. Otherwise, the system activation state is determined to be a system inactive state, and the method 100 proceeds to enter the standby state at block 108. It should be understood that in some embodiments, the accelerator pedal position may be preprocessed, for example, a time average of the accelerator pedal position may be calculated and compared to the accelerator pedal position threshold. If the time average of the accelerator pedal position does not exceed the predetermined accelerator pedal position threshold for a least a predetermined minimum delay time (e.g., one second), the accelerator pedal position is determined to be less than or equal to the predetermined accelerator pedal position threshold.

At block 118, the controller 14 starts a first timer. In the scope of the present disclosure, the first timer is a software and/or hardware timer managed by the controller 14 which tracks elapsed time since the start of the first timer. In an exemplary embodiment, the first timer is implemented by a system timer module (STM) of the controller 14. In a non-limiting example, the STM operates by utilizing a precise clock source, for example, a crystal oscillator, to generate a consistent and accurate time base. Through a series of internal registers and counters, the STM keeps track of time intervals, allowing for precise timing control and synchronization of events. The processor 22 may periodically query the STM to retrieve time-related information, such as, for example, a value of the first timer. The value indicates an elapsed time since the first timer was started at block 118. After block 118, the method 100 proceeds to blocks 122 and 124, as will be discussed in greater detail below.

At block 120, the controller 14 activates the automated driving system 18 to drive the vehicle 12. In an exemplary embodiment, the automated driving system 18 is activated in the partially automated operation mode. Therefore, the occupant is required to monitor the operation of the automated driving system 18. In another exemplary embodiment, the automated driving system 18 is activated in the fully automated operation mode. Therefore, the occupant is not required to monitor or intervene in the operation of the automated driving system 18. In an exemplary embodiment, upon activation of the automated driving system 18, the controller 14 uses the display 20 to notify the occupant of a status of the automated driving system 18. In a non-limiting example, the controller 14 displays text and/or graphics indicating that the automated driving system 18 has been activated (i.e., that the automated driving system 18 is in an active state), and/or indicating the operation mode (i.e., partially automated operation mode or fully automated operation mode) of the automated driving system 18.

In a non-limiting example, the automated driving system 18 is configured to accelerate the vehicle 12 in unison with a plurality of remote vehicles at the traffic signal. For example, the vehicle 12 may be waiting at the traffic signal at an intersection in a line with the plurality of remote vehicles. Upon arrival at block 120, the automated driving system 18 is used to accelerate the vehicle 12 in unison with the plurality of remote vehicles at the intersection, reducing formation of traffic caused by the limitations of human reaction time. For each additional remote vehicle in the plurality of remote vehicles which utilizes the system 10 and method 100, traffic formation is further mitigated. In some embodiments, the vehicle 12 may use the vehicle communication system 28 to communication with the plurality of remote vehicles (e.g., using V2V communication) to coordinate smooth and synchronized acceleration at block 120. In other embodiments, the vehicle 12 may utilize the plurality of vehicle sensors 16 to remain a predetermined distance (e.g., five meters) between the vehicle 12 and a remote vehicle in front of the vehicle 12. After block 120, the method 100 proceeds to blocks 122 and 124.

At block 122, the controller 14 continuously monitors the accelerator pedal position and the brake pedal position of the vehicle 12. If the accelerator pedal position is greater than or equal to the predetermined accelerator pedal threshold or the brake pedal position is greater than or equal to a predetermined brake pedal position threshold (e.g., five percent of a maximum brake pedal position) at any time after activation of the automated driving system 18 at block 120, the method 100 proceeds to block 126. It should also be understood that the controller 14 may monitor additional control inputs of the vehicle 12, such as, for example, a transmission shifter position, and proceed to block 126 in response to any change in control input without departing from the scope of the present disclosure. Otherwise, the method 100 returns to block 122 to continuously monitor the accelerator pedal position and the brake pedal position of the vehicle 12.

It should be understood that in some embodiments, the brake pedal position may be preprocessed, for example, a time average of the brake pedal position may be calculated and compared to the brake pedal position threshold. If the time average of the brake pedal position exceeds the predetermined brake pedal position threshold for a least a predetermined minimum delay time, the brake pedal position is determined to be greater than or equal to the predetermined brake pedal position threshold.

At block 126, the controller 14 disables the automated driving system 18. In an exemplary embodiment, upon disabling the automated driving system 18, the controller 14 provides a notification to the occupant using the display 20. In a non-limiting example, the notification is a text and/or graphic alerting the occupant that the automated driving system 18 has been disabled (i.e., that the automated driving system 18 is in an inactive state). In a non-limiting example, the notification may be accompanied by auditory and/or haptic feedback. After block 126, the method 100 proceeds to enter the standby state at block 108.

At block 124, the controller 14 determines the value of the first timer. As discussed above, the value of the first timer indicates a time elapsed since starting the first timer at block 118, and therefore, a time elapsed since activation of the automated driving system 18 at block 120. If the value of the first timer is greater than or equal to a predetermined first timer threshold (e.g., five seconds), the method 100 proceeds to blocks 128 and 130. Otherwise, the method 100 returns to block 124 to monitor the value of the first timer. In an exemplary embodiment, at block 124, the controller 14 may provide information about the value of the first timer to the occupant using the display 20. In a non-limiting example, the controller 14 displays an animation graphic, such as, for example, a countdown and/or a progress bar indicating a remaining difference between the value of the first timer and the predetermined first timer threshold.

At block 128, the controller 14 starts a second timer. The second timer is similar in function and implementation to the first timer discussed above. It should be understood that, in some embodiments, the hardware and/or software modules used to implement the first timer are reused for the second timer by resetting the value of the first timer to zero. In other embodiments, the second timer is implemented by a separate hardware and/or software module of the controller 14. After block 128, the method 100 proceeds to block 132, as will be discussed in greater detail below.

At block 130, the controller 14 uses the display 20 to prompt the occupant of the vehicle 12 to disable the automated driving system 18. In an exemplary embodiment, the controller 14 displays a text and/or graphic indicating that the occupant must take over manual control of the vehicle 12 by depressing the accelerator pedal or brake pedal of the vehicle 12. After block 130, the method 100 proceeds to block 132.

At block 132, the controller 14 determines the value of the second timer. As discussed above, the value of the second timer indicates a time elapsed since starting the second timer at block 128, and therefore, a time elapsed since prompting the occupant to disable the automated driving system 18 at block 130. If the value of the second timer is greater than or equal to a predetermined second timer threshold (e.g., five seconds), the method 100 proceeds to block 134. Otherwise, the method 100 returns to block 132 to monitor the value of the second timer. In an exemplary embodiment, at block 132, the controller 14 may provide information about the value of the second timer to the occupant using the display 20. In a non-limiting example, the controller 14 displays an animation graphic, such as, for example, a countdown and/or a progress bar indicating a remaining difference between the value of the second timer and the predetermined second timer threshold. In another non-limiting example, the controller 14 notifies the occupant that the automated driving system 18 is in a pending deactivation state, meaning that the automated driving system 18 will be disabled when the value of the second timer exceeds the predetermined second timer threshold.

At block 134, the controller 14 disables the automated driving system 18 in response to the value of the second timer exceeding the predetermined second timer threshold and failure of the occupant to manually disable the automated driving system 18, as will be discussed in greater detail below. Therefore, after a predetermined maximum time-period has expired, the automated driving system 18 is automatically disabled. The predetermined maximum time-period is equal to a sum of the predetermined first timer threshold and the predetermined second timer threshold. After block 134, the method 100 proceeds to enter the standby state at block 108.

In an exemplary embodiment, the controller 14 repeatedly exits the standby state 108 and restarts the method 100 at block 102. In a non-limiting example, the controller 14 exits the standby state 108 and restarts the method 100 on a timer, for example, every three hundred milliseconds.

In the exemplary embodiments of the method 100 described above, a first timer and a second timer are used to control the automated driving system 18. When the value of the first timer is greater than or equal to the predetermined first timer threshold, the controller 14 prompts the occupant of the vehicle 12 to disable the automated driving system 18. When the value of the second timer is greater than or equal to the predetermined second timer threshold, the controller 14 disables the automated driving system 18. In another exemplary embodiment, a distance traveled after the automated driving system 18 is activated at block 120 is used to control the automated driving system 18. For example, the occupant is prompted to disable the automated driving system 18 when the vehicle 12 has traveled a predetermined first distance (e.g., five hundred feet) since enabling the automated driving system 18. The automated driving system 18 may be automatically deactivated if the occupant fails to manually deactivate the automated driving system 18 when the vehicle has traveled a predetermined second distance (e.g., one thousand feet) since enabling the automated driving system 18.

Figure 3:
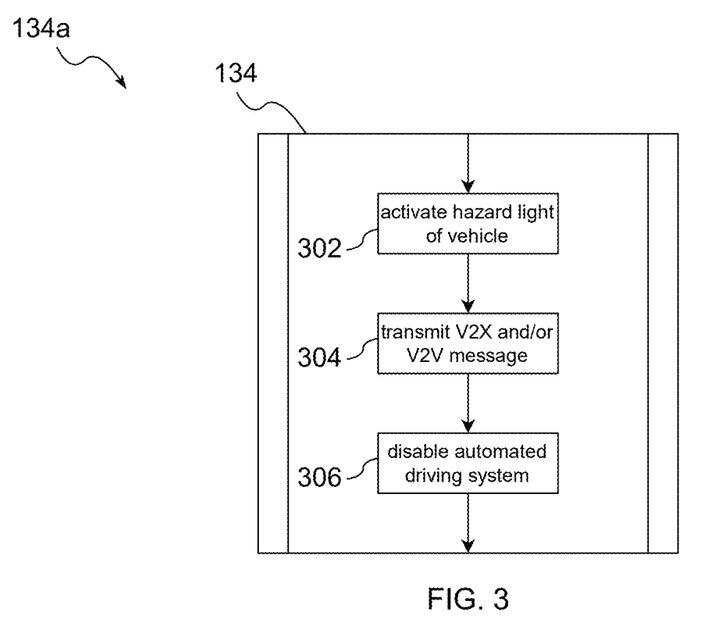
FIG. 3 is a flowchart of a method for disabling an automated driving system, according to an exemplary embodiment.

Referring to FIG. 3, a flowchart of an exemplary embodiment 134a of block 134 is shown. The exemplary embodiment 134a is used when the value of the second timer has exceeded the predetermined second timer threshold and the occupant has not manually disabled the automated driving system 18 (i.e., by depressing the accelerator pedal or the brake pedal). The exemplary embodiment 134a begins at block 302. At block 302, the controller 14 activates a hazard light of the vehicle 12. The hazard light is a light used to increase the visibility of the vehicle 12 and indicate intentions of the occupant of vehicle 12 to occupants of other vehicles. The hazard is a light disposed on an exterior of the vehicle 12. In a non-limiting example, the hazard may also serve as a turn signal and/or a brake light of the vehicle 12. In an exemplary embodiment, the hazard light includes multiple lights disposed at various locations on the exterior of the vehicle 12. Various light constructions, such as, for example, LED lights, incandescent lights, and/or halogen lights are within the scope of the present disclosure. After block 302, the exemplary embodiment 134a proceeds to block 304.

At block 304, the controller 14 uses the vehicle communication system 28 to transmit a V2X message and/or a V2V message. In an exemplary embodiment, the V2X and/or V2V messages indicate that the automated driving system 18 of the vehicle 12 has been disabled. In a non-limiting example, remote vehicles receive the V2X and/or V2V messages and take appropriate action, such as, for example, notifying occupants, taking evasive action, and/or the like. After block 304, the exemplary embodiment 134a proceeds to block 306.

At block 306, the controller 14 disables the automated driving system 18. In an exemplary embodiment, to disable the automated driving system 18, the automated driving system 18 allows the vehicle 12 to begin coasting (i.e., applies a slight negative acceleration to the vehicle 12). In another exemplary embodiment, the automated driving system 18 additionally steers the vehicle 12 to a shoulder of a roadway. In a non-limiting example, upon disabling the automated driving system 18, the controller 14 provides a notification to the occupant using the display 20. In a non-limiting example, the notification is a text and/or graphic alerting the occupant that the automated driving system 18 has been disabled (i.e., that the automated driving system 18 is in an inactive state). The notification may be accompanied by auditory and/or haptic feedback. After block 306, the exemplary embodiment 134a is concluded and the method 100 proceeds as discussed above.

The system 10 and method 100 of the present disclosure offer several advantages. Use of the system 10 and method 100 may reduce fluctuations in speed which may result in a so-called "accordion effect". The accordion effect refers to a tendency of fluctuations in speed to propagate backwards in a line of vehicles. The magnitude of the speed fluctuations may increase further down the line, resulting in reduced throughput of road traffic. Using the plurality of vehicle sensors 16, the vehicle 12 may determine a phase of a traffic signal controlling an intersection and use the automated driving system 18 to accelerate smoothly in unison with other vehicles at the intersection. This mitigates fluctuations in speed and acceleration which may be introduced by variations in reaction time and attentiveness of other drivers.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A system for mitigating traffic congestion for a vehicle, the system comprising:
 a plurality of vehicle sensors;
 an automated driving system;
 a controller in electrical communication with the plurality of vehicle sensors and the automated driving system, wherein the controller is programmed to:
  determine a traffic signal phase of a traffic signal in an environment surrounding the vehicle using the plurality of vehicle sensors, wherein the traffic signal phase includes one of: a red phase and a green phase;
  activate the automated driving system to drive the vehicle for a predetermined maximum time-period in response to determining that the traffic signal phase is the green phase, wherein to activate the automated driving system to drive the vehicle, the controller is further programmed to:
  determine a system activation state, wherein the system activation state includes one of: a system active state and a system inactive state, wherein to determine the system activation state, the controller is further programmed to:
    determine a drive mode of the vehicle, wherein the drive mode includes one of: a forward drive mode and a non-forward drive mode;
    determine a brake hold state of the vehicle, wherein the brake hold state includes one of: a brake hold active state and a brake hold inactive state;
    determine an accelerator pedal position of the vehicle; and
    determine the system activation state to be the system active state in response to determining that the drive mode is the forward drive mode, the brake hold state is the brake hold active state, and the accelerator pedal position is less than or equal to a predetermined accelerator pedal position threshold;
  activate the automated driving system to drive the vehicle in response to determining that the system activation state is the system active state and the traffic signal phase is the green phase; and
  start a first timer in response to determining that the system activation state is the system active state and the traffic signal phase is the green phase; and
  disable the automated driving system in response to determining that the predetermined maximum time-period has expired.

2. The system of claim 1, wherein the plurality of vehicle sensors further includes a camera system, and wherein to determine the traffic signal phase, the controller is further programmed to:
  capture an image of the environment surrounding the vehicle including the traffic signal using the camera system; and
  determine the traffic signal phase in the image using a computer vision algorithm.

3. The system of claim 1, wherein the plurality of vehicle sensors further includes a vehicle communication system, and wherein to determine the traffic signal phase, the controller is further programmed to:
  receive a signal phase and timing (SPaT) message from the traffic signal using the vehicle communication system, wherein the SPAT message includes the traffic signal phase.

4. The system of claim 1, wherein the plurality of vehicle sensors further includes a vehicle communication system, and wherein to determine the traffic signal phase, the controller is further programmed to:
  receive a vehicle-to-vehicle (V2V) communication from a remote vehicle, wherein the V2V communication includes the traffic signal phase.

5. The system of claim 1, wherein to disable the automated driving system, the controller is further programmed to:
  prompt an occupant of the vehicle to disable the automated driving system in response to determining that a value of the first timer is greater than or equal to a predetermined first timer threshold;
  start a second timer in response to determining that the value of the first timer is greater than or equal to the predetermined first timer threshold; and
  disable the automated driving system in response to determining that a value of the second timer is greater than or equal to a predetermined second timer threshold, wherein the predetermined maximum time-period is equal to a sum of the predetermined first timer threshold and the predetermined second timer threshold.

6. The system of claim 5, wherein the plurality of vehicle sensors further includes a vehicle communication system, and wherein to disable the automated driving system in response to determining that the value of the second timer is greater than or equal to the predetermined second timer threshold, the controller is further programmed to:
  enable a hazard light of the vehicle;
  transmit a vehicle-to-everything (V2X) message using the vehicle communication system, wherein the V2X message indicates that the automated driving system is disabled; and
  disable the automated driving system.

7. The system of claim 1, wherein to disable the automated driving system, the controller is further programmed to:
  continuously monitor an accelerator pedal position of the vehicle;
  continuously monitor a brake pedal position of the vehicle;
  disable the automated driving system in response to determining that the accelerator pedal position is greater than or equal to a predetermined accelerator pedal position threshold; and
  disable the automated driving system in response to determining that the brake pedal position is greater than or equal to a predetermined brake pedal position threshold.

8. The system of claim 1, further comprising a display in electrical communication with the controller, and wherein the controller is further programmed to:
  notify an occupant of the vehicle of a status of the automated driving system, wherein the status of the automated driving system includes one of: an active state, a pending deactivation state, and an inactive state.

9. A method for mitigating traffic congestion for a vehicle, the method comprising:
  determining a traffic signal phase of a traffic signal in an environment surrounding the vehicle using a plurality of vehicle sensors, wherein the traffic signal phase includes one of: a red phase and a green phase;
  activating an automated driving system to drive the vehicle for a predetermined maximum time-period in response to determining that the traffic signal phase is the green phase, wherein activating the automated driving system to drive the vehicle further comprises:
    determining a system activation state, wherein the system activation state includes one of: a system active state and a system inactive state, wherein determining the system activation state further comprises:
      determining a drive mode of the vehicle, wherein the drive mode includes one of: a forward drive mode and a non-forward drive mode;
      determining a brake hold state of the vehicle, wherein the brake hold state includes one of: a brake hold active state and a brake hold inactive state;

determining an accelerator pedal position of the vehicle; and determining the system activation state to be the system active state in response to determining that the drive mode is the forward drive mode, the brake hold state is the brake hold active state, and the accelerator pedal position is less than or equal to a predetermined accelerator pedal position threshold;

activating the automated driving system to drive the vehicle in response to determining that the system activation state is the system active state and the traffic signal phase is the green phase; and starting a first timer in response to determining that the system activation state is the system active state and the traffic signal phase is the green phase; and disabling the automated driving system in response to determining that the predetermined maximum time-period has expired.

10. The method of claim 9, wherein determining the traffic signal phase further comprises:

receiving a signal phase and timing (SPaT) message from the traffic signal using a vehicle communication system, wherein the SPAT message includes the traffic signal phase.

11. The method of claim 9, wherein disabling the automated driving system further comprises:

prompting an occupant of the vehicle to disable the automated driving system in response to determining that a value of the first timer is greater than or equal to a predetermined first timer threshold;

starting a second timer in response to determining that the value of the first timer is greater than or equal to the predetermined first timer threshold; and disabling the automated driving system in response to determining that a value of the second timer is greater than or equal to a predetermined second timer threshold, wherein the predetermined maximum time-period is equal to a sum of the predetermined first timer threshold and the predetermined second timer threshold.

12. The method of claim 11, wherein disabling the automated driving system in response to determining that a value of the second timer is greater than or equal to a predetermined second timer threshold further comprises:

enabling a hazard light of the vehicle;

transmitting a vehicle-to-everything (V2X) message using a vehicle communication system, wherein the V2X message indicates that the automated driving system is disabled; and disabling the automated driving system.

13. The method of claim 9, wherein disabling the automated driving system further comprises:

monitoring an accelerator pedal position of the vehicle;

monitoring a brake pedal position of the vehicle;

disabling the automated driving system in response to determining that the accelerator pedal position is greater than or equal to a predetermined accelerator pedal position threshold; and disabling the automated driving system in response to determining that the brake pedal position is greater than or equal to a predetermined brake pedal position threshold.

14. A system for mitigating traffic congestion for a vehicle, the system comprising:

a vehicle communication system;

an automated driving system;

a display;

a controller in electrical communication with the vehicle communication system, the automated driving system, and the display, wherein the controller is programmed to:

receive a signal phase and timing (SPaT) message using the vehicle communication system, wherein the SPAT message includes a traffic signal phase of a traffic signal in an environment surrounding the vehicle, and wherein the traffic signal phase includes one of: a red phase and a green phase;

determine a system activation state, wherein the system activation state includes one of: a system active state and a system inactive state;

activate the automated driving system to drive the vehicle in response to determining that the system activation state is the system active state and the traffic signal phase is the green phase;

start a first timer in response to determining that the system activation state is the system active state and the traffic signal phase is the green phase;

prompt an occupant of the vehicle to disable the automated driving system using the display in response to determining that a value of the first timer is greater than or equal to a predetermined first timer threshold;

start a second timer in response to determining that the value of the first timer is greater than or equal to the predetermined first timer threshold; and disable the automated driving system in response to determining that a value of the second timer is greater than or equal to a predetermined second timer threshold.

15. The system of claim 14, wherein to disable the automated driving system, the controller is further programmed to:

enable a hazard light of the vehicle;

transmit a vehicle-to-everything (V2X) message using the vehicle communication system, wherein the V2X message indicates that the automated driving system is disabled; and disable the automated driving system.

16. The system of claim 15, wherein to disable the automated driving system, the controller is further programmed to:

continuously monitor an accelerator pedal position of the vehicle;

continuously monitor a brake pedal position of the vehicle;

disable the automated driving system in response to determining that the accelerator pedal position is greater than or equal to a predetermined accelerator pedal position threshold; and disable the automated driving system in response to determining that the brake pedal position is greater than or equal to a predetermined brake pedal position threshold.

* * * * *